(12) United States Patent
Seo

(10) Patent No.: US 7,168,730 B2
(45) Date of Patent: Jan. 30, 2007

(54) ASSEMBLY STRUCTURE OF AIRBAG CASE

(75) Inventor: Young Duk Seo, Kyunggi-do (KR)

(73) Assignee: Hyundai Mobis Co., Ltd., Yongin-Shi (KR)

( * ) Notice: Subject to any disclaimer, the term of this patent is extended or adjusted under 35 U.S.C. 154(b) by 178 days.

(21) Appl. No.: 10/650,757

(22) Filed: Aug. 29, 2003

(65) Prior Publication Data

US 2005/0035574 A1 Feb. 17, 2005

(30) Foreign Application Priority Data

Aug. 13, 2003 (KR) ............. 10-2003-0056236

(51) Int. Cl.
*B60R 21/205* (2006.01)
(52) U.S. Cl. .................... 280/728.2; 280/732
(58) Field of Classification Search ............ 280/728.2, 280/732; 24/297, 453, 662; *B62D 64/00, B62D 64/14; B23P 19/04*
See application file for complete search history.

(56) References Cited

U.S. PATENT DOCUMENTS

| | | | | | |
|---|---|---|---|---|---|
| 1,964,002 | A | * | 6/1934 | Lester | ............... 40/202 |
| 2,305,277 | A | * | 12/1942 | Sloane et al. | ........... 24/662 |
| 3,614,815 | A | * | 10/1971 | Nysten | ........... 24/662 |
| 5,062,663 | A | * | 11/1991 | Satoh | ......... 280/728.3 |
| 5,378,012 | A | * | 1/1995 | Seiki et al. | ......... 280/728.3 |
| 5,423,568 | A | * | 6/1995 | Zushi et al. | ......... 280/728.2 |
| 5,427,406 | A | * | 6/1995 | Zushi et al. | ......... 280/728.2 |
| 5,613,701 | A | * | 3/1997 | Bentley et al. | ......... 280/728.3 |
| 5,775,724 | A | * | 7/1998 | Tonooka et al. | ......... 280/728.2 |
| 5,788,267 | A | * | 8/1998 | Lotspih et al. | ......... 280/728.2 |
| 6,231,068 | B1 | * | 5/2001 | White et al. | ......... 280/728.2 |
| 2003/0184063 | A1 | * | 10/2003 | Yasuda et al. | ......... 280/732 |

FOREIGN PATENT DOCUMENTS

JP 07052845 A * 2/1995

* cited by examiner

*Primary Examiner*—Paul N. Dickson
*Assistant Examiner*—Laura B. Rosenberg
(74) *Attorney, Agent, or Firm*—Greenblum & Bernstein, P.L.C.

(57) ABSTRACT

Disclosed herein is an assembly structure of an airbag case that is capable of adjustably assembling an airbag case to an instrument panel considering assembly tolerance. The structure comprises an airbag case for accommodating an airbag and an inflator supplying a high-pressure gas to the airbag when a collision occurs, brackets formed at the airbag case and attached to a cowl cross member by means of bolts, and pins formed at the airbag case. The pins are inserted into pinholes formed at an instrument panel, respectively, for fixing the airbag case to the instrument panel. Around the pinholes are formed cut lines so that the pins are movable when assembly tolerance between the pins and the corresponding pinholes is created. With the assembly structure of the airbag case according to the present invention, coupling positions between brackets of the airbag case and the cowl cross member exactly correspond to each other by simply moving the airbag case when the brackets are attached to the cowl cross member by means of bolts, whereby poor assembly due to tolerance is prevented.

14 Claims, 4 Drawing Sheets

ASSEMBLY STRUCTURE OF AIRBAG CASE

BACKGROUND OF THE INVENTION

1. Field of the Invention

The present invention relates to an airbag device of a vehicle for protecting a passenger in the vehicle when a collision occurs, and more particularly to an assembly structure of an airbag case that is capable of adjustably assembling an airbag case to an instrument panel considering assembly tolerance.

2. Description of the Related Art

As shown in FIG. 1, a conventional airbag device for vehicles generally comprises: an airbag case 2 mounted to an instrument panel; an airbag (not shown) accommodated in the front part of the airbag case 2; an inflator (not shown) mounted to the rear part of the airbag case 2 for supplying a high-pressure gas to the airbag so that the airbag is expanded when a collision occurs; and an impact sensor for sensing a collision of a vehicle, whereby the airbag is expanded toward a passenger in the vehicle when the collision occurs to absorb kinetic energy from the passenger and thus protect the passenger from injury.

The airbag case 2 comprises: a cushion housing 1 for accommodating the airbag; and a can housing 3 attached to the rear part of the cushion housing 1 for accommodating the inflator.

At the cushion housing 1 is formed a flange 10, which is attached to the instrument panel by means of a bolt. At the can housing 3 are formed brackets 12, which are attached to a cowl cross member by means of bolts, respectively, while hanging on the cowl cross member.

In the above-mentioned conventional art, however, positions and shapes of the coupling part between the flange 10 and the instrument panel and of the coupling parts between the brackets 12 and the cowl cross member are fixed, whereby it is difficult to assemble the airbag case 2 due to tolerance when the flange 10 and the instrument panel are connected with each other by means of the bolt and when the brackets 12 and the cowl cross member are connected with each other by means of the bolts.

Of course, the flange 10 and the brackets 12 are designed considering the tolerance. However, the assembly tolerance between the flange 10 and the instrument panel and the assembly tolerance between the brackets 12 and the cowl cross member affect each other. As a result, the tolerance of the parts to be secondly assembled becomes high to the extent that the parts to be secondly assembled cannot be connected to each other after the parts to be firstly assembled are connected to each other by means of the bolt or the bolts, which leads to a high rate of poor assembly.

SUMMARY OF THE INVENTION

Therefore, the present invention has been made in view of the above problems, and it is an object of the present invention to provide an assembly structure of an airbag case wherein coupling parts between the airbag case and the instrument panel and between the airbag case and the cowl cross member are adjustably designed, whereby poor assembly due to tolerance is prevented.

In accordance with one aspect of the present invention, the above and other objects can be accomplished by the provision of an assembly structure of an airbag case, comprising: an airbag, an inflator for supplying a high-pressure gas to the airbag when a collision occurs, and an airbag case for accommodating the airbag, the inflator being mounted in the airbag case; an instrument panel and a cowl cross member mounted to the body of a car; brackets formed at the airbag case and attached to the cowl cross member; pins for fixing the airbag case to the instrument panel; and cut lines formed around pinholes so that the pins are movable when assembly tolerance between the pins and the corresponding pinholes is created, the pins being inserted through the pinholes, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

An assembly structure of an airbag case according to a preferred embodiment of the present invention will now be described with reference to the accompanying drawings.

Figure 1:
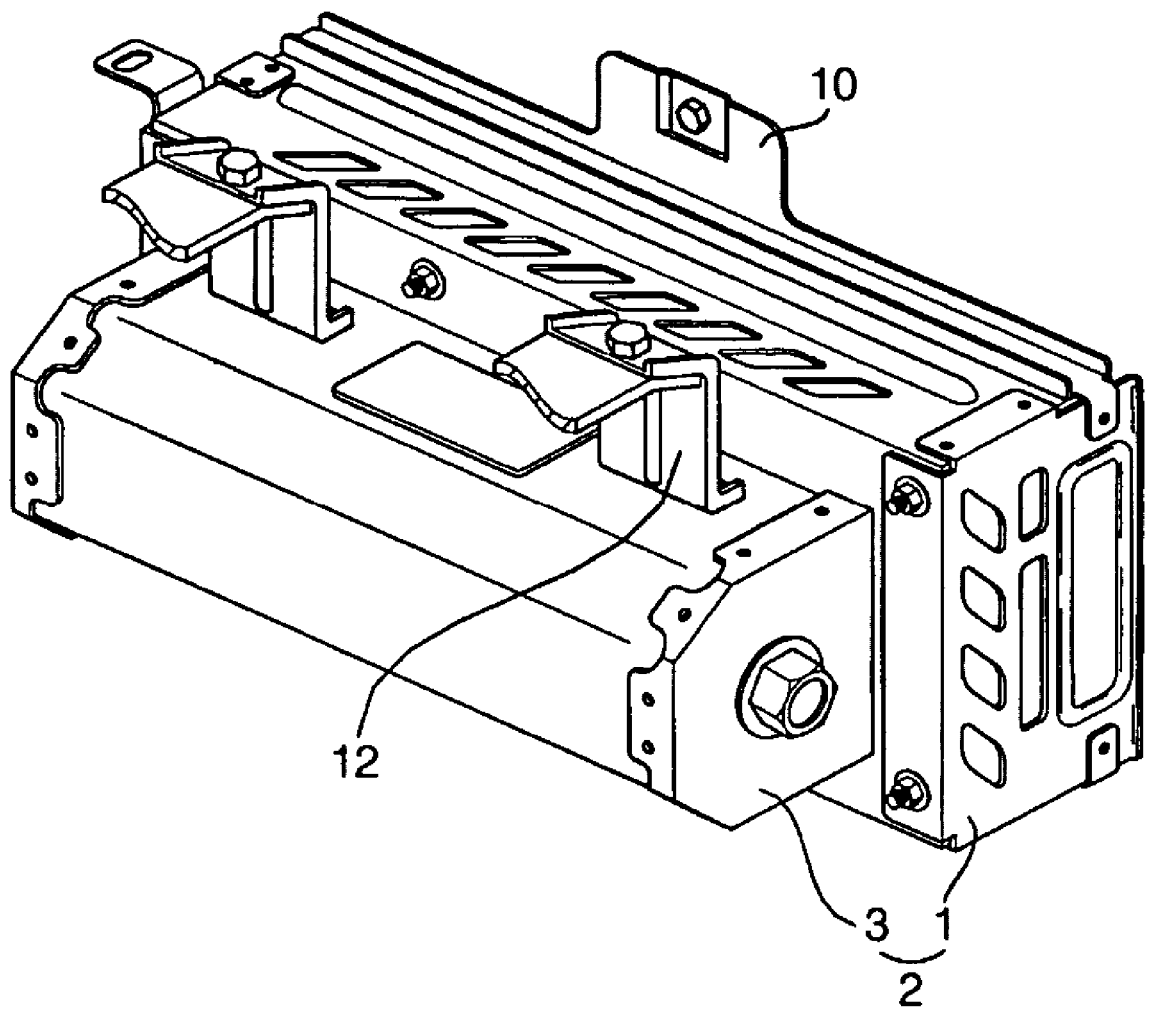
FIG. 1 is a perspective view showing a conventional assembly structure of an airbag case.
Figure 2:
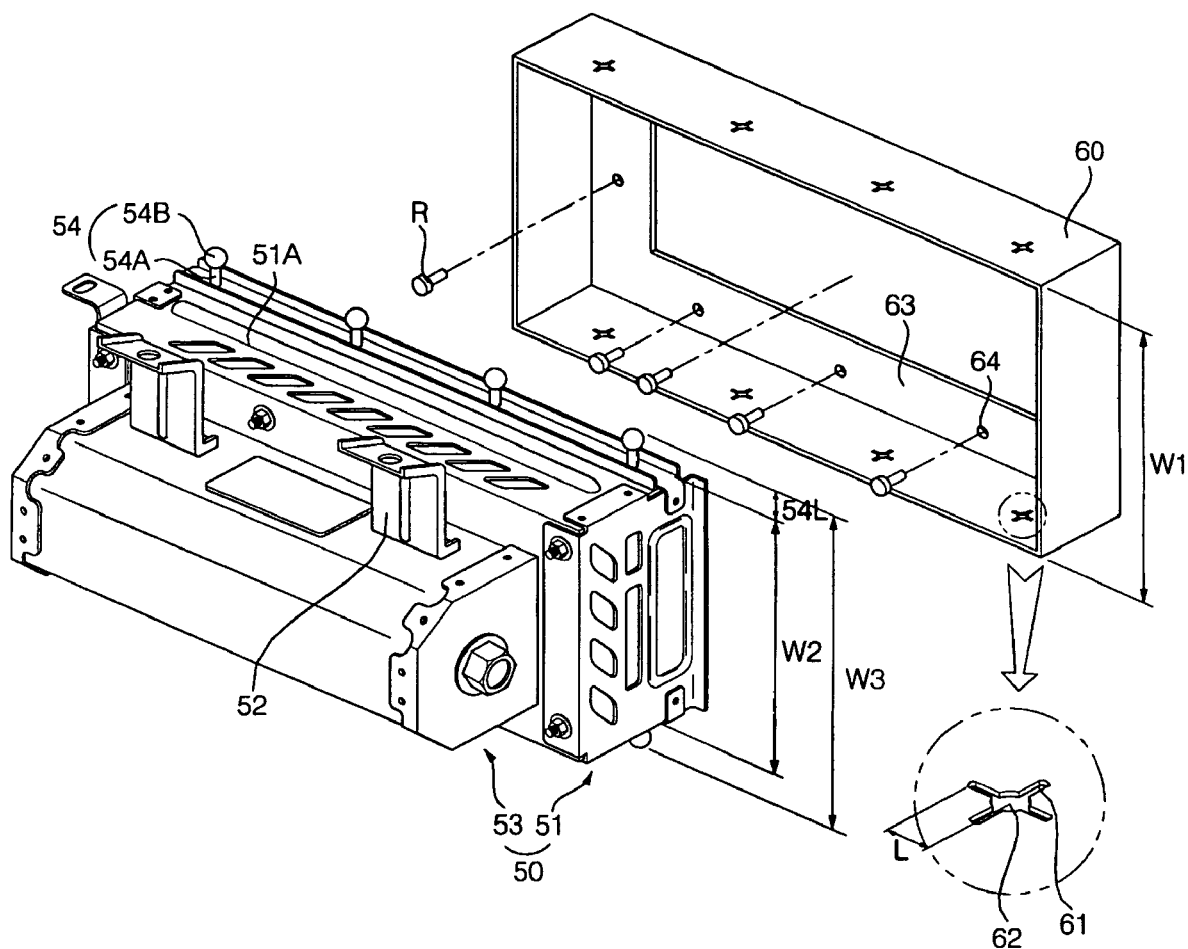
FIG. 2 is an exploded perspective view showing an assembly structure of an airbag case according to a preferred embodiment of the present invention.
Figure 3:
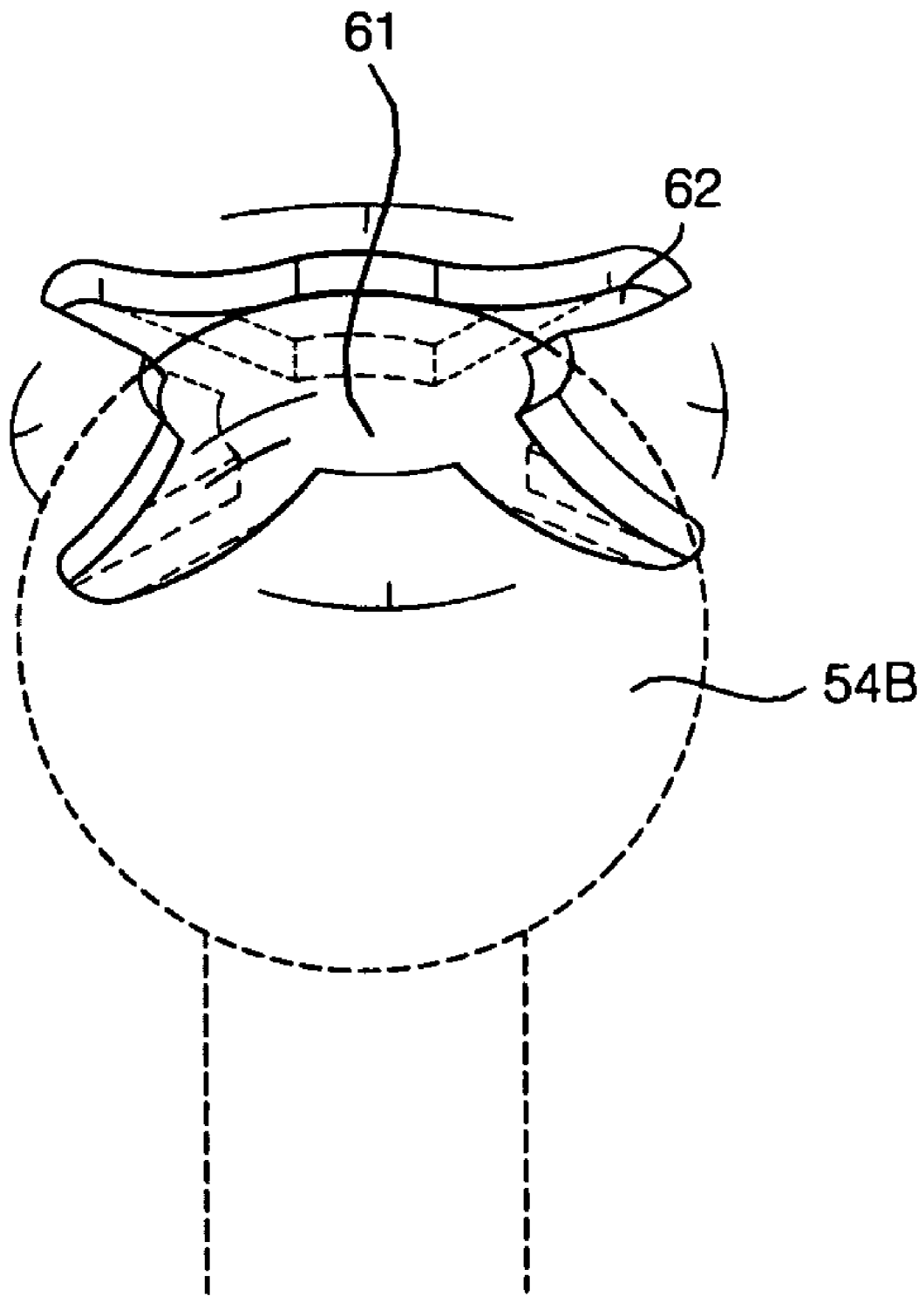
FIG. 3 is a view showing a pin of the present invention inserted into a pinhole.
Figure 4:
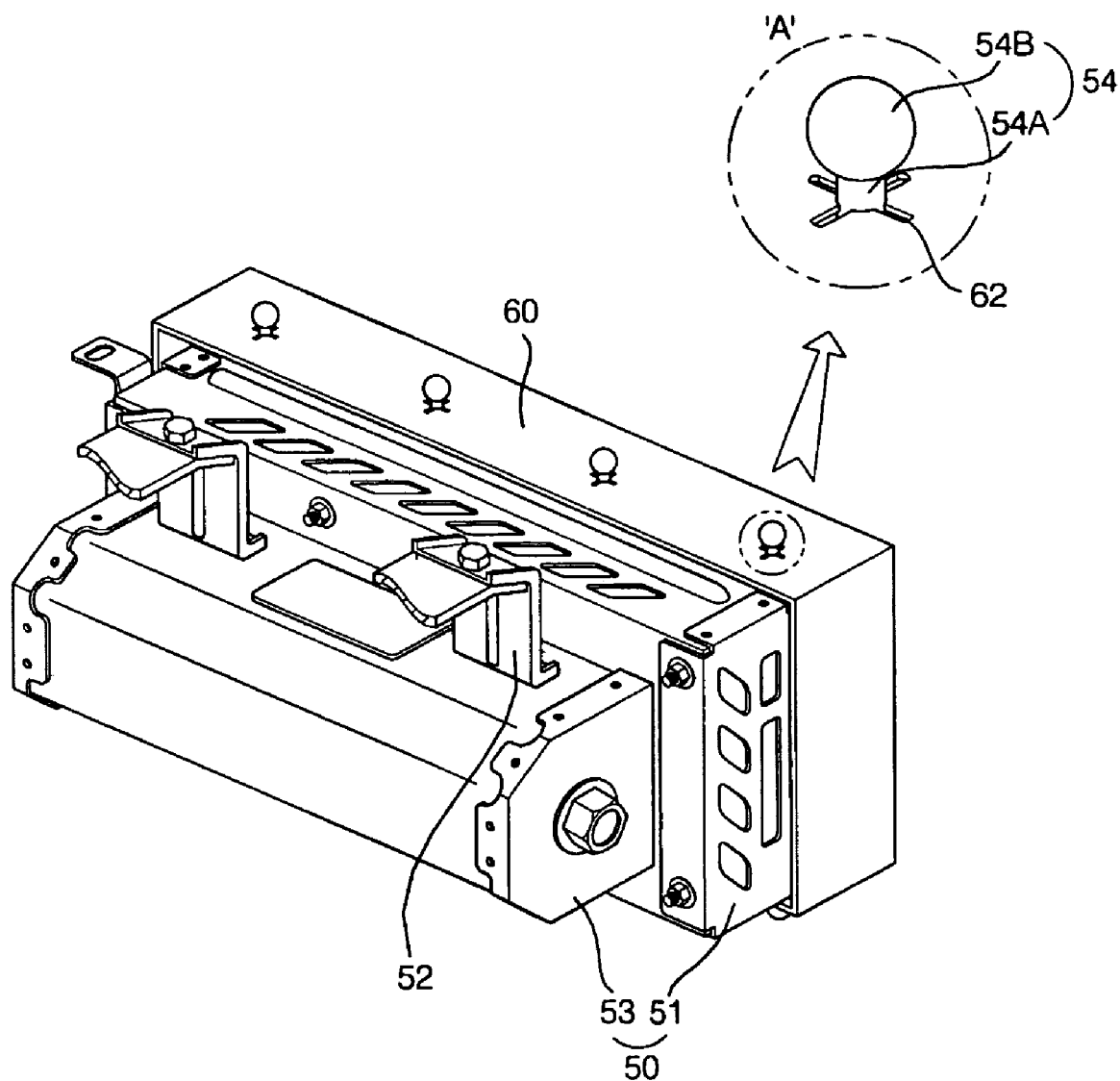
FIG. 4 is a perspective view showing the airbag case of the present invention assembled with a retainer.

FIG. 2 is an exploded perspective view showing an assembly structure of an airbag case according to a preferred embodiment of the present invention, FIG. 3 is a view showing a pin of the present invention inserted into a pinhole, and FIG. 4 is a perspective view showing the airbag case of the present invention assembled with a retainer.

The assembly structure of the airbag case of the present invention comprises: an airbag case 50 for accommodating an airbag and an inflator; brackets 52 formed at the airbag case and attached to a cowl cross member by means of bolts; pins 54 formed at the airbag case 50, the pins 54 being inserted into pinholes 61 formed at an instrument panel, respectively, for fixing the airbag case 50 to the instrument panel; and cut lines 62 formed around the pinholes 61 so that the pins 54 are movable when assembly tolerance between the pins 54 and the corresponding pinholes 61 is created.

The airbag case 50 comprises: a cushion housing 51 for accommodating the airbag; and a can housing 53 attached to the cushion housing 51 in a line for accommodating the inflator. At the cushion housing 51 are vertically formed the pins 54, by which the cushion housing 51 is coupled with the instrument panel. At the can housing 53 are formed the brackets 52, by which the can housing 53 is coupled with the cowl cross member.

The pins 54 are arranged in parallel with the instrument panel. To the instrument panel is mounted a retainer 60, which is opposite to side surfaces of the cushion housing 51 and has the pinholes 61 and the cut lines 62 formed at the positions corresponding to the pins 54, respectively.

The retainer 60 is formed in the shape of a rectangular band so that the retainer 60 surrounds the side surfaces of the cushion housing 51. The width W1 of the retainer 60 is larger than the width W2 of the cushion housing 51 and smaller than the distance W3, which is the sum of the width W2 of the cushion housing 51 and the length 54L of each of the pins 54, so that the pins 54 are inserted into the pinholes 61, respectively. Preferably, the retainer 60 is made of a plastic material with a prescribed elastic force so that the cushion housing can be easily inserted into the retainer 60.

The pins 54 are provided at both longitudinal sides 51A of the cushion housing 51. For example, four pins are provided at either side of the cushion housing 51. Consequently, the distance W3, which is the sum of the width W2 of the cushion housing 51 and the length 54L of each of the pins 54, corresponds to the distance between pins opposite to each other about the cushion housing 51. The width W1 of the retainer 60 is smaller than the distance between pins opposite to each other about the cushion housing 51.

With the retainer 60 is integrally formed a flange 63, which is provided at the end of the retainer 60 close to the instrument panel so that the flange 63 makes contact with the instrument panel. The flange 63 is formed in the shape of a rectangular band, which is vertically bent from the end of the retainer 60 toward the inside of the retainer 60. The flange 63 has rivet coupling holes 64, through which the flange 63 is coupled with the instrument panel.

The pins 54 are vertically protruded from the longitudinal sides 51A of the cushion housing 51 toward the retainer 60. Each of the pins 54 comprises a pole 54A having a diameter smaller than the inner diameter of each of the pinholes 61, and a stopper 54B formed at one end of the pole 54A. The stopper 54B has a size larger than the inner diameter of each of the pinholes 61. The stopper 54B is preferably formed in the shape of a sphere so that the stopper 54B is easily inserted through the corresponding pinhole 61 by virtue of the cut lines 62. Consequently, the stopper 54B makes rolling contact with the circumference of the corresponding pinhole 61. The radius of the stopper 54B is smaller than a distance L from the center of the pinhole 61 and one end of each of the cut lines 62.

When the pin 54 is inserted through the corresponding pinhole 61 as shown in FIG. 3, the circumference of the pinhole 61 is elastically bent by means of the stopper 54B in the direction in which the pin 54 is inserted. As a result, the pinhole 61 is expanded so that the stopper 54B is inserted through the pinhole 61. When the stopper 54B is completely inserted through the pinhole 61 as shown in 'A' of FIG. 4, the circumference of the pinhole 61 is elastically restored. As a result, the stopper 54B is caught in the pinhole 61, by which the separation of the pin 54 from the pinhole 61 is prevented, and thus the cushion housing 51 is securely attached to the retainer 60.

The cut lines 62 are formed around the pinhole 61 at an angle of 90 degrees. The cut lines 62 are formed in the shape of a cross so that the cut lines 62 are radially arranged around the pinhole 61 while being uniformly spaced apart from each other. In other words, the cut lines 62 are formed in the shape of slits, respectively, which are outwardly extended from the pinhole 61.

The assembly operation of the airbag case with the above-stated construction according to the preferred embodiment of the present invention will now be described.

First, the retainer 60 is attached to the instrument panel by means of rivets R, and then the airbag case 50 is fitted into the retainer 60, as shown in FIG. 2. Consequently, the airbag case 50 is attached to the instrument panel as shown in FIG. 4.

At this time, the retainer 60 is elastically deformed so that the airbag case 50 is fitted into the retainer 60 while the pins 54 are not caught by the retainer 60.

When the airbag case 54 is completely fitted in the retainer 60, the pins 54 and the pinholes 61 are positioned in a line so that the stoppers 54B of the pins 54 are outwardly protruded from the retainer 60 through the corresponding pinholes 61, respectively. Consequently, the airbag case 50 is securely fixed to the retainer 60.

Next, the brackets 52 are put on the cowl cross member in such a manner that coupling positions between the brackets 52 and the cowl cross member correspond to each other.

The coupling positions between the brackets 52 and the cowl cross member may not correspond to each other due to tolerance. In this case, it is possible to move the airbag case so that the coupling positions between the brackets 52 and the cowl cross member correspond exactly to each other since the cut lines 62 are formed around the pinholes 61 and thus the pins 54 can be outwardly moved from the pinholes in four directions.

Finally, when the brackets 52 are attached to the cowl cross member by means of the bolts while the coupling positions between the brackets 52 and the cowl cross member exactly correspond to each other, the airbag case 50 is securely supported by the instrument panel and the cowl cross member. In this way, the assembly operation of the airbag case 50 is completed.

As apparent from the above description, the present invention provides an assembly structure of an airbag case wherein pinholes are formed at an instrument panel, pins inserted through the pinholes are formed at an airbag case, and cut lines are formed around the pinholes so that coupling positions between brackets of the airbag case and a cowl cross member exactly correspond to each other by simply moving the airbag case when the brackets are attached to the cowl cross member by means of bolts, whereby poor assembly due to tolerance is prevented. Also, efficiency of the assembly between the brackets and the cowl cross member is increased since the coupling positions between the brackets of the airbag case and the cowl cross member always correspond to each other.

Furthermore, replacement of an airbag device is accomplished by simply pulling a used airbag case out of the instrument panel and then pushing a new airbag case into the instrument panel without necessity of disassembling a retainer from the instrument panel, whereby maintenance efficiency is increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An assembly structure of an airbag case, comprising:
an airbag;
an airbag case that accommodates the airbag;
an inflator that supplies a high-pressure gas to the airbag when a collision occurs, the inflator being mounted in the airbag case;
an instrument panel and a cowl cross member mountable to a body of a car;
a plurality of brackets formed at the airbag case and attached to the cowl cross member;
a plurality of pins that fix the airbag case to the instrument panel; and
a plurality of cut lines formed around each of a plurality of pinholes located in a retainer so that the pins are movable when assembly tolerance between the pins and the corresponding pinholes is created, the pins being inserted through respective pinholes, wherein the airbag case is fixed to the instrument panel in a manner such that the airbag case can be readily removed and replaced without disassembly of the retainer.

2. The structure as set forth in claim 1, wherein the pins are formed at the airbag case, and the pinholes and the cut lines are provided at the instrument panel.

3. The structure as set forth in claim 2, wherein each of the pins comprises:

a pole extended from the airbag case toward the instrument panel so that the pole is inserted through the corresponding pinhole; and a stopper formed at one end of the pole, the stopper having a size larger than the inner diameter of the corresponding pinhole to prevent separation of the pin from the corresponding pinhole after the pin is inserted through the pinhole by the cut lines.

4. The structure as set forth in claim 3, wherein the stopper is formed in a spherical shape.

5. The structure as set forth in claim 2, wherein a number of the pins are provided at either longitudinal side of the airbag case.

6. The structure as set forth in claim 2, further comprising the retainer mounted to the instrument panel, the retainer being opposite to side surfaces of the airbag case, wherein the pinholes and the cut lines are formed in the retainer, and the pins are formed at the airbag case opposite to the retainer.

7. The structure as set forth in claim 6, wherein the retainer is formed in a rectangular band shape so that the retainer surrounds the side surfaces of the airbag case.

8. The structure as set forth in claim 1, wherein the retainer is made of an elastically deformable plastic material so that the airbag case is inserted into the retainer while the pins are not caught by the retainer.

9. The structure set forth in claim 8, wherein the width of the retainer is larger than the width of the airbag case and smaller than the sum of the width of the airbag case and the length of each of the pins.

10. The structure set forth in claim 6, further comprising a flange formed at the retainer, the flange being provided at the end of the retainer close to the instrument panel so that the flange makes contact with the instrument panel, wherein the flange is attached to the instrument panel by rivets.

11. The structure as set forth in claim 10, wherein the flange is formed at the inside of the retainer.

12. The structure as set forth in claim 10, wherein the flange is formed in-rectangular bend shape around the airbag case.

13. The structure as set forth in claim 1, wherein a number of the cut lines are formed around each of the pinholes, and the cut lines are formed in a cross shape.

14. The structure as set forth in claim 1, wherein the cut lines are formed in a slit shape outwardly extending from respective pinholes.

* * * * *